US011540453B1

United States Patent
DeSautell

(10) Patent No.: US 11,540,453 B1
(45) Date of Patent: Jan. 3, 2023

(54) UMBRELLA FOR HANGING FLOWER BASKET

(71) Applicant: DC Products, LLC, Skiatook, OK (US)

(72) Inventor: William Kyle DeSautell, Skiatook, OK (US)

(73) Assignee: DC Products, LLC, Skiatook, OK (US)

( * ) Notice: Subject to any disclaimer, the term of this patent is extended or adjusted under 35 U.S.C. 154(b) by 0 days.

(21) Appl. No.: 17/341,568

(22) Filed: Jun. 8, 2021

Related U.S. Application Data

(60) Provisional application No. 63/036,161, filed on Jun. 8, 2020.

(51) Int. Cl.
  *A01G 13/02* (2006.01)
  *A01G 9/22* (2006.01)
  *A01G 9/02* (2018.01)

(52) U.S. Cl.
  CPC ......... *A01G 13/0212* (2013.01); *A01G 9/024* (2013.01); *A01G 9/22* (2013.01)

(58) Field of Classification Search
  CPC ............ A01G 13/0212; A01G 13/0206; A01G 9/024; A01G 9/22; A45B 25/24; A45B 25/18
  See application file for complete search history.

(56) References Cited

U.S. PATENT DOCUMENTS

| | | | | | |
|---|---|---|---|---|---|
| 1,066,061 | A | * | 7/1913 | Taylor | A45B 25/24 135/15.1 |
| 2,150,971 | A | * | 3/1939 | Heilmann | A45B 19/06 135/25.31 |
| 3,706,160 | A | * | 12/1972 | Deibert | A01G 13/0212 47/2 |
| 3,950,637 | A | * | 4/1976 | Rodin | A01G 9/249 248/318 |
| 4,154,255 | A | * | 5/1979 | Weaver | A45B 23/00 135/16 |
| 4,194,319 | A | * | 3/1980 | Crawford | A47G 7/042 47/21.1 |
| 4,304,068 | A | * | 12/1981 | Beder | A01G 13/043 47/29.1 |
| 4,449,542 | A | * | 5/1984 | McSwain | A01M 31/025 135/21 |
| 5,930,948 | A | * | 8/1999 | Daniel | A01G 13/10 135/900 |
| 6,230,436 | B1 | * | 5/2001 | Givens | A01G 9/22 47/29.5 |
| 6,230,440 | B1 | * | 5/2001 | Deutsch | A47G 7/041 47/67 |
| 7,611,116 | B2 | * | 11/2009 | Santa Cruz | A47G 7/047 248/327 |

(Continued)

*Primary Examiner* — Timothy D Collins
*Assistant Examiner* — Maria E Graber
(74) *Attorney, Agent, or Firm* — GableGotwals

(57) ABSTRACT

A protective device for use with a hanging planter includes a container that houses a shade. Both the container and the shade are connected to a main shaft that includes a runner. The shade is connected to the runner. When the runner is toward the top end of the container, the shade is housed by the container and is not deployed. When the runner is toward the bottom end of the container, the shade is deployed and extends outward of the container side-to-side.

20 Claims, 2 Drawing Sheets

(56) References Cited

U.S. PATENT DOCUMENTS

| | | | |
|---|---|---|---|
| 8,079,176 B1* | 12/2011 | Thead | A01G 13/043 47/29.6 |
| 2001/0050097 A1* | 12/2001 | Fazel | A45B 25/24 135/48 |
| 2004/0099299 A1* | 5/2004 | Wu | E04H 15/28 135/98 |
| 2004/0216376 A1* | 11/2004 | Missry | A01G 9/02 47/66.6 |
| 2005/0166452 A1* | 8/2005 | Felknor | A01G 9/0291 47/73 |
| 2007/0007275 A1* | 1/2007 | Berg | A01G 13/0212 219/448.11 |
| 2008/0092440 A1* | 4/2008 | Johnson | A01G 13/0212 47/66.6 |
| 2008/0148631 A1* | 6/2008 | Wan | H02S 20/30 47/20.1 |
| 2014/0026475 A1* | 1/2014 | Centeno | A01G 13/02 47/29.5 |
| 2014/0076422 A1* | 3/2014 | Anga | A01G 27/003 137/406 |
| 2014/0360542 A1* | 12/2014 | Beyer | A45B 25/24 135/15.1 |
| 2015/0366145 A1* | 12/2015 | Dingwerth | E04H 15/28 47/20.1 |
| 2019/0029190 A1* | 1/2019 | Masri | A01G 13/0206 |
| 2021/0037933 A1* | 2/2021 | Farmer | A45B 25/18 |

* cited by examiner

UMBRELLA FOR HANGING FLOWER BASKET

CROSS-REFERENCE TO CO-PENDING APPLICATIONS

This application claims priority to U.S. 63/036,161 filed Jun. 8, 2020.

BACKGROUND

This disclosure is in the field of devices and methods intended to protect plants contained in hanging baskets from certain amounts of rainfall or sunlight that may damage the plant.

Since the advent of the hanging flower basket it has become very common for the gardener to protect the plant from heavy rainfalls and scorching direct sunlight. The common way of protection is to take down the hanging flower basket and store it away during these periods. The problem with this typical solution is the burden of dropping, spilling, or dumping the plant material, finding a safe place to store the basket, and the task of re-hanging the basket back up.

SUMMARY

Embodiments of a protective device of this disclosure are configured for use with a hanging basket and include a container housing an extendable and retractable shade, the shade when extended providing cover beyond at least a portion of the perimeter of the container. A user can extend and retract the shade to provide a plant of the hanging basket protection from weather extremes such as heavy rain or scorching direct sunlight. In embodiments, the shade moves to its extended position as it moves downward toward a bottom end of the container and to its retracted position as it moves upward toward a top end of the container. The protective device may be configured for outdoor use. In some embodiments, the shade may include a pattern to express artistic individuality. The protective device may include means at one end to connect to a hanging basket which contains the plant to be protected and means at another end to connect the device to a structure from which the protective device can he suspended.

In embodiments, the shade is connected to adjacent pairs of rods spaced at right angles to one another. The rods may bend or flex within the confines of the container and extend radially outward as each rod clears a bottom end of the container. Each section of shade covers less than the total area of the arcuate segment or pie slice shape formed between the adjacent rods. The section of shade may cover one half, one third, or one quarter of the total area, leaving an open arcuate shaped section between the rods that contains no shade material. When the shade is fully deployed, these open sections may be covered at least in part by a corresponding section of the container located above the open section.

In embodiments of a protective device of this disclosure for use with a hanging planter, the protective device may include a container having an open bottom end, a closed top end, and closed sides, the container further including container hanging means at the closed top end; a main shaft housed by, and arranged coaxial to, the container and extending between the open bottom end and the closed top end, the main shaft including a slot toward the closed top end of the container and a hanging planter hanging means toward the open bottom end of the container; a runner arranged about, and coaxial to, the main shaft and movable along the main shaft between a fully retracted position toward the closed top end of the container and a fully extended position toward the open bottom end of the container, the runner including a latch and a plurality of receivers, the latch moveable between a locked position within the slot of the main shaft and an unlocked position; a plurality of rods, each rod connected to a corresponding one of the runners; and a shade, which may be in sections, connected to the plurality of rods; wherein when the rod is in the fully retracted position the shade is housed by the container; and wherein when the rod is in the fully extended position at least a portion of the shade extends outward of an outer perimeter of the open bottom end of the container.

Embodiments of a method of this disclosure for shielding or protecting a plant residing in a hanging planter includes connecting the hanging planter to the protective device, the protecting device and moving the rod from the fully retracted position to the fully extended position, wherein at least a portion of the shade extends outward of an outer perimeter of the open bottom end of the container.

Figure 1:
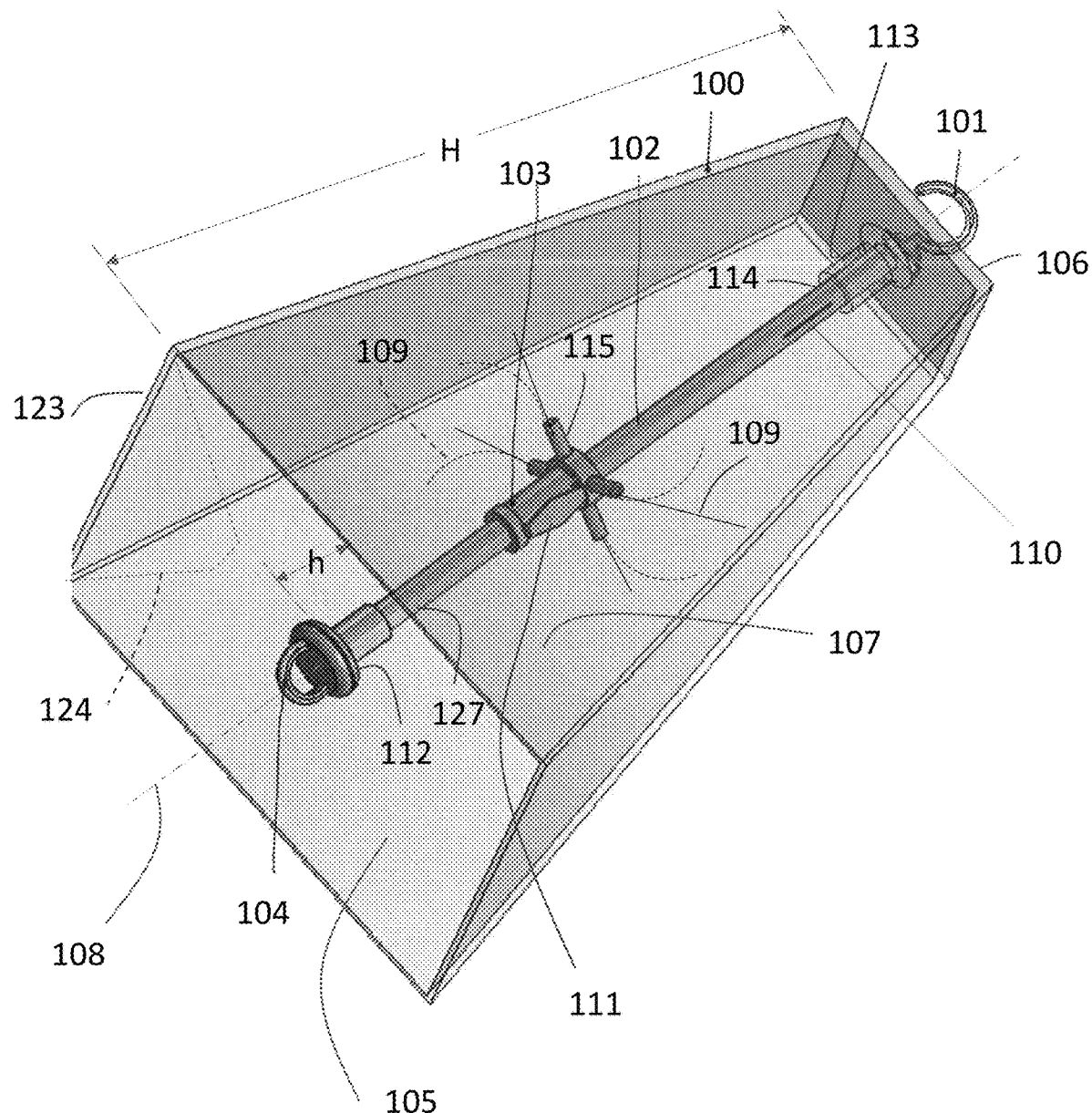
FIG. 1 is an embodiment of a protective device of this disclosure with the shade (not shown) in a partially retracted state and contained by the container. The shade, which may be made of a fabric material is moveable between a fully retracted state and a fully extended state as the shade is moved downward toward an open bottom end of the container. The shade is fully retracted when its runner has reached an upper end of its travel and fully extended when the runner has reached its lower end of travel, at which point the shade clears a bottom end of the container.
Figure 2:
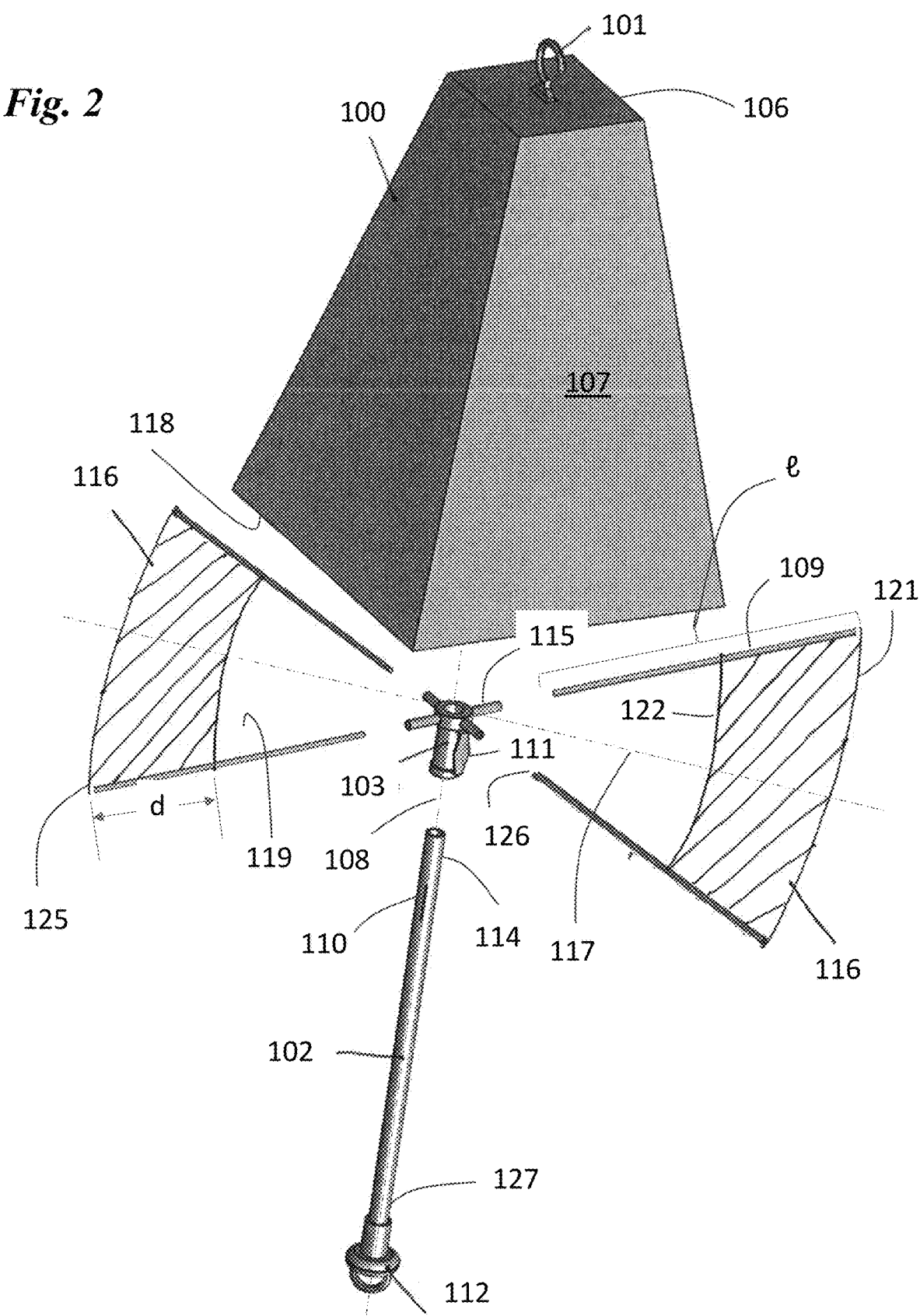
FIG. 2—is an exploded assembly view of the protective device of FIG 1.

Elements and Numbering Used in the Drawings and Detailed Description

100 Container
101 Attachment means at upper end
102 Main shaft
103 Runner
104 Attachment means at lower end
105 Open bottom end
106 Closed top end
107 Side
108 Central longitudinal axis
109 Rod or arm
110 Latch receiver slot
111 Latch
112 Flange or stop
113 Sleeve
114 Upper end of main shaft
115 Rod or arm receiver
116 Shade
117 Central lateral axis
118 Lowermost edge
119 Open area between rods containing no shade
121 Outer perimeter of shade
122 Inner perimeter of shade
123 Outer perimeter of open bottom end of container
124 Section of container covering open area between rods containing no shade
125 Outermost end of rod 126 Innermost end of rod
127 Lower end of main shaft
d Total depth of shade
h Distance between lowermost end of main shaft and lowermost edge of container
H Total height of container
Total length of rod

DETAILED DESCRIPTION

Referring to the drawings, embodiments of a protective device of this disclosure include a multi-sided container 100 having an open bottom end 105, a closed top end 106, and closed sides 107. The protective device may be configured for use with a hanging basket of a kind known in the art (not shown) and used to contain a volume of soil and a plant. The container 100 may include an attachment device 104 located toward its open bottom end 105 that is configured to receive a hook of the hanging basket. The closed top end 106 may include an attachment device 101 that permits the container 100 to be suspended from another structure or device. Attachment devices 101 and 104 may be a hook, an eyelet, or a strap.

In embodiments, container 100 may include four solid or closed sides 107, Adjacent sides 107 may be in fixed relation to one another, as is the closed top end 106 to the sides 107. In some embodiments, the sides 107 may be connected by a living hinge, permitting the container 100 to collapse for storage or shipping. Where a living hinge is used, stiffening means such as a hoop or its equivalent may be used to help the container 100 maintain its shape when in use.

The container 100 may be tapered along its length, being wider at the open bottom end 105 than at the closed top end 106. In other embodiments, the container 100 may be non-tapered. The open bottom end 105 may be square-, rectangular-, or circular-shaped. Other shapes may be used, including triangular- and oval-shaped. In some embodiments, the open-bottom end 105 is sized to reside within a perimeter of the upper end of the hanging basket. In other embodiments, the open bottom end 105 may be sized to contain or surround the perimeter of at least the uppermost end of the hanging basket. The container 100 may be made of any material suitable, including but not limited to plastic, metal, or wood. The container 100 may be translucent or opaque.

Located along a central longitudinal axis 108 of the container 100, and partly contained between the open bottom end 105 and the closed top end 106 is a main shaft 102. The main shaft 102 may be a tube, pole, or pipe that attaches at its upper end 109 to the closed top end 106. In embodiments, the closed top end 106 may include a sleeve 113 sized to tightly receive and secure the upper end 127 of the main shaft 102. The shaft 102 extends a distance "h" below that of the overall height "H" of the container 100. The distance h permits a shade 116 to extend radially outward beyond the outer perimeter 123 of the open bottom end 105 of the container 100.

Arranged about the main shaft 102 is a runner 103 configured to slide up and down along the outside of the main shaft 102. In embodiments, the runner 103 includes receivers 115 sized to receive a corresponding rod 109. A latch 111—which may be a spring loaded latch that cooperates with a slot 110—may be used to secure the runner 103 in a fully retracted position until it is released by a user. The main shaft 102 allows the runner 103 to extend or retract a shade 116 that is connected to the rods 109, the shade 116 moving into or out of the container 100. The shade 116, which deploys in a way opposite that of an umbrella, extends radially outward as the runner 103 moves downward and retracts radially inward as the runner 103 moves upward. The shade 116 may be made of a fabric material like that known in the art and used in umbrellas.

The rods 109 to which the shade 116 is connected may be semi-rigid rods, bending or flexing along at least a portion of their length "l" within the confines of the container 100 as the runner 103 slides up or down. The height H of the container 100 can be sized to accommodate the arm length "l" necessary to provide a predetermined depth "d" of shade 116 when the shade 116 is fully extended and forming a skirt about the open bottom end 105 of the container 100, In embodiments, and as explained below, d<l. In some embodiments d is in a range of ¼l to ¾l. In other embodiments, d=l.

The rods 109 (and therefore the receivers 115) may be spaced in a range of 60° to 120° apart, depending on the number of rods 109 used. In embodiments, the arm 109 is tapered, having a greater cross section area—and therefore greater rigidity—toward its innermost end 126 than at is outermost end 125, which provides flexibility (analogous to a fishing rod). As the runner 103 clears the lowermost edge 118 of the container, the rods 109 extend to their full length radially outward as each clears a lowermost edge 118 of the container 100. When fully extended, the rods 109 hold the shade 116 in tension.

The protective device may include M rods 109 and N sections of shade 116, where M, N >0 and both integers. In some embodiments, the number of sections of shade 116 may equal the number of rods 109, In other embodiments, the number of sections of shade 116 may be less than the number of rods 109. For example, the protective device may include four rods 109 and four sections of shade 116 or two sections of shade 116. Each section of shade 116 is connected to adjacent pairs of rods 109. The outer perimeter 121 of the shade 116 is located toward the outermost end 125 of the rod 109 and the inner perimeter 122 is located toward, but spaced apart from, the innermost end 126 of the rod 109. In embodiments, each section of shade 116 covers less than the total area of the arcuate segment or pie slice shape formed between the adjacent rods 109.

Regardless of the number of rods 109 and sections of shade 116, the total distance d between the inner and outer perimeter 121, 125 of the shade 116 is less than a total length C of the rod 109. The shade 116 may cover one half, one third, or one quarter of the total area formed between the adjacent rods 109, leaving an open arcuate shaped section 119 between the rods 109, the section 119 being located toward an inner end 126 of the arm. This section 119 contains no portion of the shade 116. When the shade 116 is fully deployed, these open sections 119 may be covered at least in part by a corresponding section 124 of the container 100 located directly above the open section 119. While embodiments of a protective device for use with a hanging planter have been described and examples of their use provided, the invention is defined by the following claims, including the full range of equivalents to which recited element and limitation is entitled.

What is claimed:

1. A protective device adapted for use with a hanging planter, the protective device comprising:
   a container (100) having an open bottom end (105), a closed top end (106), and closed sides (107), the container further including a container hanger (101) at the closed top end, the container hanger selected from the group consisting of a hook, an eyelet, and a strap;

a main shaft (102) connected to, housed by, and arranged coaxial to, the container and extending between the open bottom end and the closed top end, the main shaft including a slot (110) toward the closed top end of the container and a planter hanger (104) toward the open bottom end of the container, the planter hanger selected from the group consisting of a hook, an eyelet, and a strap;

a runner (103) arranged about, and coaxial to, the main shaft and movable along the main shaft between a fully retracted position toward the closed top end of the container and a fully extended position toward the open bottom end of the container, the runner including a latch (111) and a plurality of receivers (115), the latch moveable between a locked position within the slot of the main shaft and an unlocked position;

a plurality of rods (109), each rod connected to a corresponding one of the receivers;

a shade (116) connected to the plurality of rods;

wherein the runner in the fully retracted position places the shade in a non-deployed state housed by the container; and wherein the runner in the fully extended position places the shade in a fully deployed state and at least a portion of the shade extends outward of an outer perimeter (123) of the open bottom end of the container, the shade in the fully deployed state being wider side-to-side than the open bottom end of the container.

2. The protective device of claim 1, further comprising, the plurality of rods being flexible, wherein, the shade is held in a relaxed condition by the rods when the shade is in the undeployed state, and wherein, the shade is held in tension by the rods when the shade is in the deployed state.

3. The protective device of claim 1, the container having a same shape when the shade is in the undeployed and deployed states.

4. The protective device of claim 1, wherein the container is tapered between the open bottom end and the closed top end.

5. The protective device of claim 1, wherein the latch is in the locked position and the shade is in the non-deployed state and the latch is in the unlocked position and the shade is in the fully deployed state.

6. The protective device of claim 1, each rod of the plurality of rods having an innermost end (126) and an outermost end (125), the innermost end having a greater cross section than the outermost end.

7. A protective device adapted for use with a hanging planter, the protective device comprising:

a main shaft including a runner that is moveable along the main shaft;

a container connected at its upper end to the main shaft, the container having a closed top, closed sides, and an open bottom, the main shaft being at least partially housed by the container;

a shade connected to the runner;

wherein the runner is toward the closed top end and the shade is in a non-deployed state housed by the container; and wherein the runner is toward the open bottom of the container and the shade is in a deployed state outward of the open bottom end of the container and wider side-to-side than the open bottom end of the container; and wherein the container remains in a same position relative to the main shaft as the shade moves between the non-deployed and deployed states.

8. The protective device of claim 7 further comprising, the shade connected to a plurality of rods, each rod of the plurality being flexible, the shade being held in a relaxed condition by the rods when the shade is in the undeployed state, the shade being held in tension by the rods when the shade is in the deployed state.

9. The protective device of claim 7, the container having a same shape when the shade is in the undeployed and deployed states.

10. The protective device of claim 7, wherein the container is tapered between the open bottom end and the closed top end.

11. The protective device of claim 7, each rod of the plurality of rods having an innermost end and an outermost end, the innermost end having a greater cross section.

12. The protective device of claim 7, further comprising, a hanger at each end of the main shaft, each hanger selected from the group consisting of a hook, an eyelet, and a strap.

13. The protective device of claim 7, further comprising, the main shaft including a slot, the runner including a latch, the latch moveable between a locked position within the slot of the main shaft and an unlocked position.

14. The protective device of claim 13, wherein the latch is in the locked position and the shade is in the non-deployed state.

15. The protective device of claim 13, wherein the latch is in the unlocked position and the shade is in the fully deployed state. than the outermost end.

16. A protective device adapted for use with a hanging planter, the protective device comprising:

a main shaft including a slot and a runner, the runner moveable along the main shaft and including a latch, the latch moveable between a locked position within the slot of the main shaft and an unlocked position;

a hanger at each end of the main shaft;

a container connected at its upper end to the main shaft, the container having a closed top, closed sides, and an open bottom, the main shaft being at least partially housed by the container, the container being in fixed relation to the main shaft; and a shade and flexible rods, the shade connected to the runner by the flexible rods, the shade moveable by the runner between an undeployed state and a deployed state;

wherein in the undeployed state the shade is housed by the container, the runner is toward the closed top of the container, and the latch is in the locked position; and wherein in the deployed state the shade is radially outward in a sideways direction of the open bottom of the container, the runner is toward the open bottom of the container, and the latch is in the unlocked position.

17. The protective device of claim 16, the container having a same shape when the shade is in the undeployed and deployed states.

18. The protective device of claim 16, wherein the container is wider at the open bottom than at the closed top.

19. The protective device of claim 16, each of the flexible rods has an innermost end and an outermost end, the innermost end having a greater cross section than the outermost end.

20. A method for shielding a plant residing in a hanging planter, the method comprising:

connecting the hanging planter to a protective device, the protecting device including:

a container (100) having an open bottom end (105), a closed top end (106), and closed sides (107), the container further including a container hanger (101) at the closed top end, the container hanger selected from the group consisting of a hook, an eyelet, and a strap;

a main shaft (102) housed by, and arranged coaxial to, the container and extending between the open bottom end and the closed top end, the main shaft including a slot (110) toward the closed top end of the container and a planter hanger (104) toward the open bottom end of the container, the planter hanger selected from the group consisting of a hook, an eyelet, and a strap;

a runner (103) arranged about, and coaxial to, the main shaft and movable along the main shaft between a fully retracted position toward the closed top end of the container and a fully extended position toward the open bottom end of the container, the runner including a latch (111) and a plurality of receivers (115), the latch moveable between a locked position within the slot of the main shaft and an unlocked position;

a plurality of rods (109), each rod connected to a corresponding one of the receivers;

a shade (116) connected to the plurality of rods;

moving the runner from the fully retracted position to the fully extended position and thereby moving the shade from a non-deployed state housed by the container to a fully deployed state wherein at least a portion of the shade extends outward of an outer perimeter (123) of the open bottom end of the container, the shade in the fully deployed state being wider side-to-side than the open bottom end of the container.

* * * * *